(12) United States Patent
Taniyasu et al.

(10) Patent No.: US 10,430,964 B2
(45) Date of Patent: Oct. 1, 2019

(54) IMAGE PROCESSING DEVICE, CONTROL SYSTEM, CONTROL METHOD OF IMAGE PROCESSING DEVICE, CONTROL PROGRAM, AND RECORDING MEDIUM

(71) Applicant: OMRON Corporation, Kyoto-shi, Kyoto (JP)

(72) Inventors: Yuki Taniyasu, Ritto (JP); Gaku Shiramizu, Ayabe (JP)

(73) Assignee: OMRON Corporation, Kyoto-shi (JP)

( * ) Notice: Subject to any disclaimer, the term of this patent is extended or adjusted under 35 U.S.C. 154(b) by 118 days.

(21) Appl. No.: 15/786,967

(22) Filed: Oct. 18, 2017

(65) Prior Publication Data
US 2018/0204342 A1    Jul. 19, 2018

(30) Foreign Application Priority Data
Jan. 17, 2017 (JP) .................................. 2017-005993

(51) Int. Cl.
*G06T 7/70* (2017.01)
*G06T 7/246* (2017.01)

(52) U.S. Cl.
CPC .............. *G06T 7/70* (2017.01); *G06T 7/248* (2017.01); *G06T 2207/10016* (2013.01); *G06T 2207/30164* (2013.01)

(58) Field of Classification Search
CPC .. G06T 7/20; G06T 7/70; G06T 7/248; G06T 7/292; G06T 7/74; G06T 2207/30232; G06T 2207/10016; G06T 2207/30164; G06K 9/00771

USPC .......................................................... 382/103
See application file for complete search history.

(56) References Cited

U.S. PATENT DOCUMENTS

| | | | |
|---|---|---|---|
| 7,006,950 B1* | 2/2006 | Greiffenhagen | G08B 13/19604 382/107 |
| 2001/0010541 A1* | 8/2001 | Fernandez | G08B 13/19608 348/143 |
| 2005/0128291 A1* | 6/2005 | Murakami | H04N 7/181 348/143 |
| 2005/0237390 A1* | 10/2005 | Mittal | G06K 9/209 348/169 |
| 2012/0045091 A1* | 2/2012 | Kaganovich | G06T 7/579 382/103 |
| 2014/0198955 A1 | 7/2014 | Deigmoeller et al. | |
| 2014/0301632 A1 | 10/2014 | Ikeda et al. | |
| 2017/0066597 A1* | 3/2017 | Hiroi | B65G 1/137 |

FOREIGN PATENT DOCUMENTS

| | | |
|---|---|---|
| JP | H11-85235 A | 3/1999 |
| JP | 2000-180810 A | 6/2000 |
| JP | 2004-198124 A | 7/2004 |

(Continued)

*Primary Examiner* — Ali Bayat
(74) *Attorney, Agent, or Firm* — Metrolex IP Law Group, PLLC

(57) ABSTRACT

An image processing device includes a predicted position calculator configured to predict a current position of a target object, an obtained image analyzer configured to search for a position of the target object from a predetermined region that is a partial region of a captured image and that includes a position predicted by the predicted position calculator, and an analysis result outputting unit configured to output the position of the target object retrieved by the obtained image analyzer.

17 Claims, 17 Drawing Sheets

(56) References Cited

FOREIGN PATENT DOCUMENTS

| JP | 2012-242315 A | 12/2012 |
|---|---|---|
| JP | 2014-137815 A | 7/2014 |
| JP | 2014-203365 A | 10/2014 |

* cited by examiner

IMAGE PROCESSING DEVICE, CONTROL SYSTEM, CONTROL METHOD OF IMAGE PROCESSING DEVICE, CONTROL PROGRAM, AND RECORDING MEDIUM

CROSS-REFERENCE TO RELATED APPLICATION

This application is based on Japanese Patent Application No. 2017-005993 filed with the Japan Patent Office on Jan. 17, 2017, the entire contents of which are incorporated herein by reference.

FIELD

The disclosure relates to an image processing device for position control, a control method of the image processing device, a control system for position control, a control program, a recording medium and the like.

BACKGROUND

An image processing technique is known to be used by an inspection device or a measurement device in a manufacturing site. For example, a device that performs positioning by using an image processing technique so as to process or inspect a target object is known.

Patent Document 1 describes a manufacturing device that is configured to perform positioning by controlling a conveying section based on the position of a positioning mark.

Also, Patent Document 2 describes a control system that is configured to position a target object at a target position by using image data that is acquired by capturing an image of the target object provided with a characteristic portion for positioning.

[Patent Document 1] JP 2000-180810 A (published on Jun. 30, 2000)

[Patent Document 2] JP 2014-203365 A (published on Oct. 27, 2014)

[Patent Document 3] JP 2004-198124 A (published on Jul. 15, 2004)

[Patent Document 4] JPH 11-85235 A (published on Mar. 30, 1999)

[Patent Document 5] JP 2012-242315 A (published on Dec. 10, 2012)

[Patent Document 6] JP 2014-137815 A (published on Jul. 28, 2014)

To increase the accuracy of positioning or inspection, the resolution of an imaging device has to be increased; that is, the resolution of the imaging device has to be enhanced. However, if the resolution of the imaging device is enhanced, the number of pixels is increased, and the image transfer time and the image processing time are thereby increased. A specific description will be given with reference to FIG. 17. FIG. 17 is a diagram illustrating a relationship between the number of pixels and a processing time. As illustrated in FIG. 17, the processing time is increased as the number of pixels is increased from 300,000 to 12 million.

Accordingly, accuracy enhancement and speed enhancement have a trade-off relationship, and it is difficult to achieve a good balance between the two.

Moreover, the techniques described in Patent Documents 1 and 2 above do not take any measures to achieve both enhancement of accuracy and reduction in the processing time.

SUMMARY

An aspect may realize an image processing device and the like for reducing the processing time while increasing the accuracy of positioning or inspection.

To solve the problems described above, an image processing device according to an aspect is an image processing device that is used for position control of a target object and that is configured to detect a position of the target object from a captured image captured by an imaging device, the image processing device including a predicting unit configured to predict a current position of the target object, a searching unit configured to search for a position of the target object from a predetermined region that is a partial region of the captured image and that includes a position predicted by the predicting unit, and an outputting unit configured to output the position of the target object retrieved by the searching unit.

According to the configuration described above, in the case of controlling the position of a target object by position control, the position of the target object may be measured by searching only a predetermined region, in a captured image captured by the imaging device, including a predicted current position of the target object. This allows the amount of processing to be reduced compared to a case of searching the entire captured image. Also, even if the resolution of the imaging device is enhanced, the amount of processing is not significantly increased, because search is performed only on a part of a captured image. Accordingly, the processing time can be reduced while increasing the accuracies of positioning of the target object and inspection of the target object.

According to the image processing device according to an aspect, the predicting unit may predict the current position of the target object by using instruction information from a control device configured to control a position of the target object.

The instruction information from the control device is for controlling the target object, and when the information is used, the movement of the target object may be predicted. According to the configuration described above, the current position of the target object is predicted by using the instruction information from the control device, and thus, accurate prediction may be performed.

According to the image processing device according to an aspect, the predicting unit may predict the current position of the target object by using a change in a position of the target object in a plurality of captured images captured by the imaging device.

If the change in the position of the target object up to the current position is monotonic, the change in the position up to then and the change in the position from then on are highly likely the same. According to the configuration described above, the current position of the target object is predicted from the change in the position of the target object in a plurality of captured images, and thus, if the change in the position is monotonic, the current position may be appropriately predicted.

The image processing device according to an aspect may include a notifying unit configured to notify the imaging device of the predetermined region, and an obtaining unit configured to obtain a part of the captured image corresponding to the predetermined region from the imaging device, where the searching unit may search for the position of the target object from the part, obtained by the obtaining unit, of the captured image corresponding to the predetermined region.

According to the configuration described above, only the captured image of a predetermined region which is a search target is obtained from the imaging device, and thus, the amount of data of an image that is transmitted from the imaging device may be reduced. The processing time may thereby be reduced.

The image processing device according to an aspect may include an obtaining unit configured to obtain the captured image from the imaging device, and a region extracting unit configured to extract the predetermined region from the captured image obtained by the obtaining unit, where the searching unit may search for the position of the target object from the predetermined region extracted by the region extracting unit.

According to configuration described above, it is possible to extract only the predetermined region, which is a search target, from the captured region. Accordingly, it is possible to search only the predetermined region.

According to the image processing device according to an aspect, a plurality of the imaging devices may be present, the predicting unit may predict the current position of the target object from a first captured image that is captured by a first imaging device that is one of the plurality of imaging devices, and the searching unit may search for the position of the target object from a second captured image that is captured by a second imaging device that is another one of the plurality of imaging devices, the second captured image capturing a predetermined region including a position predicted by the predicting unit.

According to the configuration described above, the first imaging device may perform capturing of the whole image, and capturing may be performed by the second imaging device by using only a part of the foregoing result to thereby search for the position of the target object. A more accurate position of the target object may thereby be grasped.

To solve the problems described above, a control system according to one or more aspects includes the image processing device and a conveying device, where a position of the target object is moved by the conveying device, and the first imaging device is installed on an upstream side of the conveying device than the second imaging device.

According to the configuration described above, the first imaging device is installed on the upstream side of the conveying device, and the second imaging device is installed on the downstream side than the first imaging device, and thus, prediction of the position of the target object performed using a captured image of the first imaging device may be appropriately reflected in an imaging position of the second imaging device. Accordingly, the second imaging device may accurately capture an image of the target object, and the position of the target object may be accurately grasped. Also, the accuracy of inspection may be increased.

To solve the problems described above, a control system according to one or more aspects includes the image processing device, a control device configured to control a position of the target object, and an imaging device configured to capture an image of a region including the target object.

According to the configuration described above, the same effect as the foregoing effect may be achieved.

To solve the problems described above, a control method of an image processing device according to one or more aspects is a control method of an image processing device that is used for position control of a target object and that is configured to detect a position of the target object from a captured image captured by an imaging device, the control method including predicting a current position of the target object, searching for a position of the target object from a predetermined region that is a partial region of the captured image and that includes a position predicted in the predicting, and outputting the position of the target object retrieved in the searching.

According to the configuration described above, the same effect as the foregoing effect may be achieved.

The image processing device according to each aspect on may be realized by a computer, and in this case, a control program of an image processing device which causes the computer to realize the image processing device by causing the computer to operate as each unit (software element) provided to the image processing device, and a computer-readable recording medium recording the control program are also included within the scope of the present invention.

According to an aspect, an effect that the amount of processing can be reduced compared to a case where search is performed on the entire captured image can be achieved. Also, even if the resolution of the imaging device is enhanced, the amount of processing is not significantly increased, because search is performed only on a part of the captured image. Accordingly, an effect that the processing time can be reduced while increasing the accuracies of positioning of the target object and inspection of the target object can be achieved.

BRIEF DESCRIPTION OF THE DRAWINGS

FIG. 3A is a flowchart illustrating a flow of processing, and FIG. 3B is a diagram illustrating processing of a control system in a simplified manner;

FIG. 10A is a flowchart illustrating a flow of processing, and FIG. 10B is a diagram illustrating processing of a control system in a simplified manner;

FIG. 13A is a diagram illustrating an outline of a control system, FIG. 13B is a diagram illustrating an example image that is captured by a first imaging unit, and FIG. 13C is a diagram illustrating an example image that is captured by a second imaging unit;

DETAILED DESCRIPTION

First Embodiment

Figure 2:
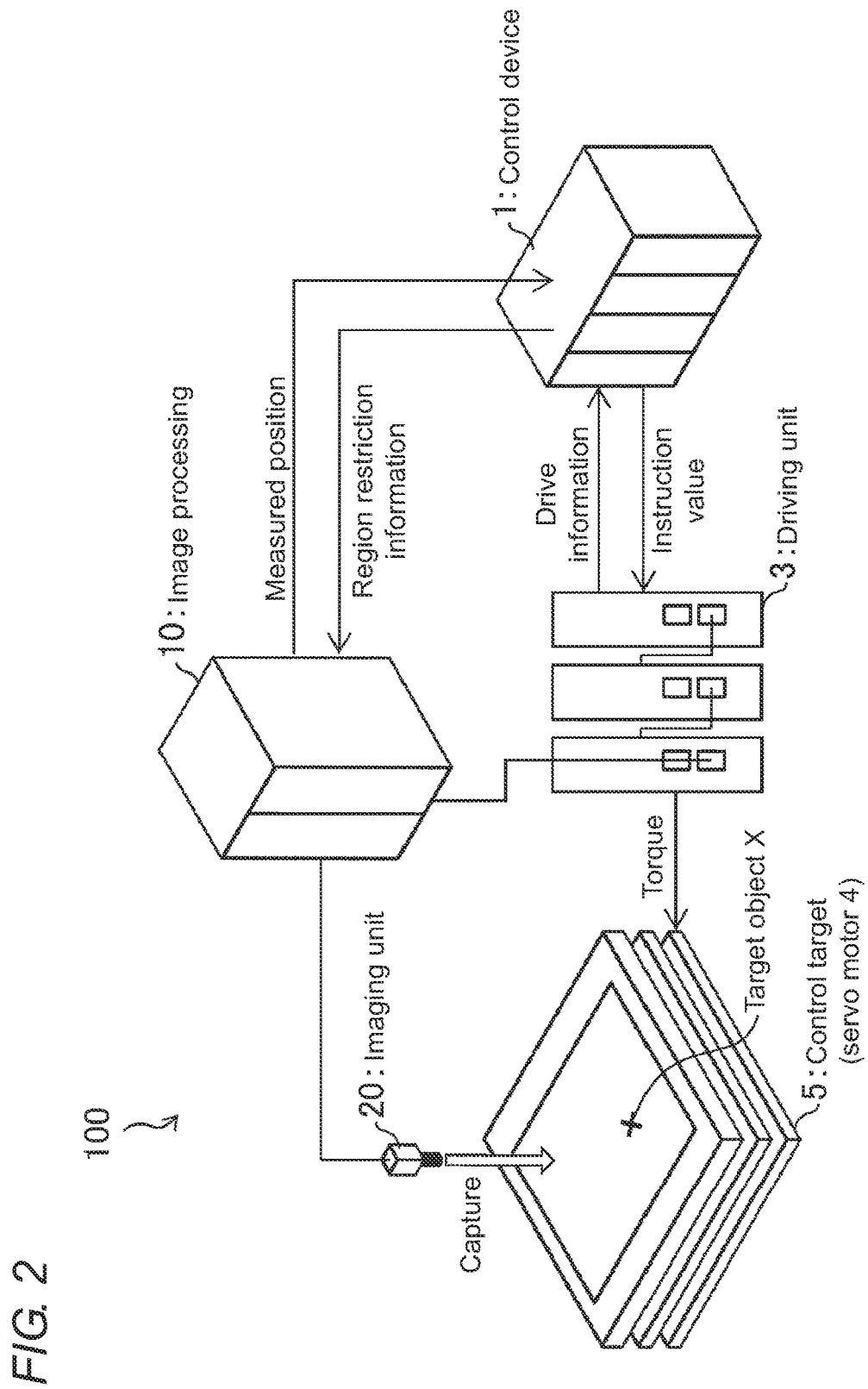
FIG. 2 is a diagram schematically illustrating a control system according to an embodiment.

Hereinafter, an embodiment will be described in detail. First, an outline of a control system 100 according to an embodiment will be described with reference to FIG. 2. FIG. 2 is a diagram schematically illustrating the control system 100.

As illustrated in FIG. 2, briefly describing, the control system 100 according to an embodiment includes a control device 1, a servo driver 3, a control target 5 (servo motor 4), an image processing device 10, and an imaging unit (imaging device) 20. An instruction value generated by the control device 1 is input to the servo driver 3, and the servo driver 3 drives the servo motor 4 by torque that is based on the received instruction value so as to perform position control of a target object X at the control target 5. In an embodiment, an XYθ stage is assumed as the control target 5, and the position of the target object X on the XYθ stage is to be controlled.

Also, the imaging unit 20 captures an image of the control target 5, and the captured image is processed by the image processing device 10. The control device 1 is thereby notified of the accurate position of the target object X at the control target 5, and accurate position control is thus realized. By realizing accurate position control, accurate positioning of the target object X at the control target 5, and accurate inspection at the control target 5 may be realized, for example.

Moreover, according to an embodiment, the amount of processing is reduced by predicting the position of the target object X at the control target 5 and thereby restricting a search region in a captured image captured by the imaging unit 20. A high-resolution captured image may thereby be processed in a short time.

Figure 4:
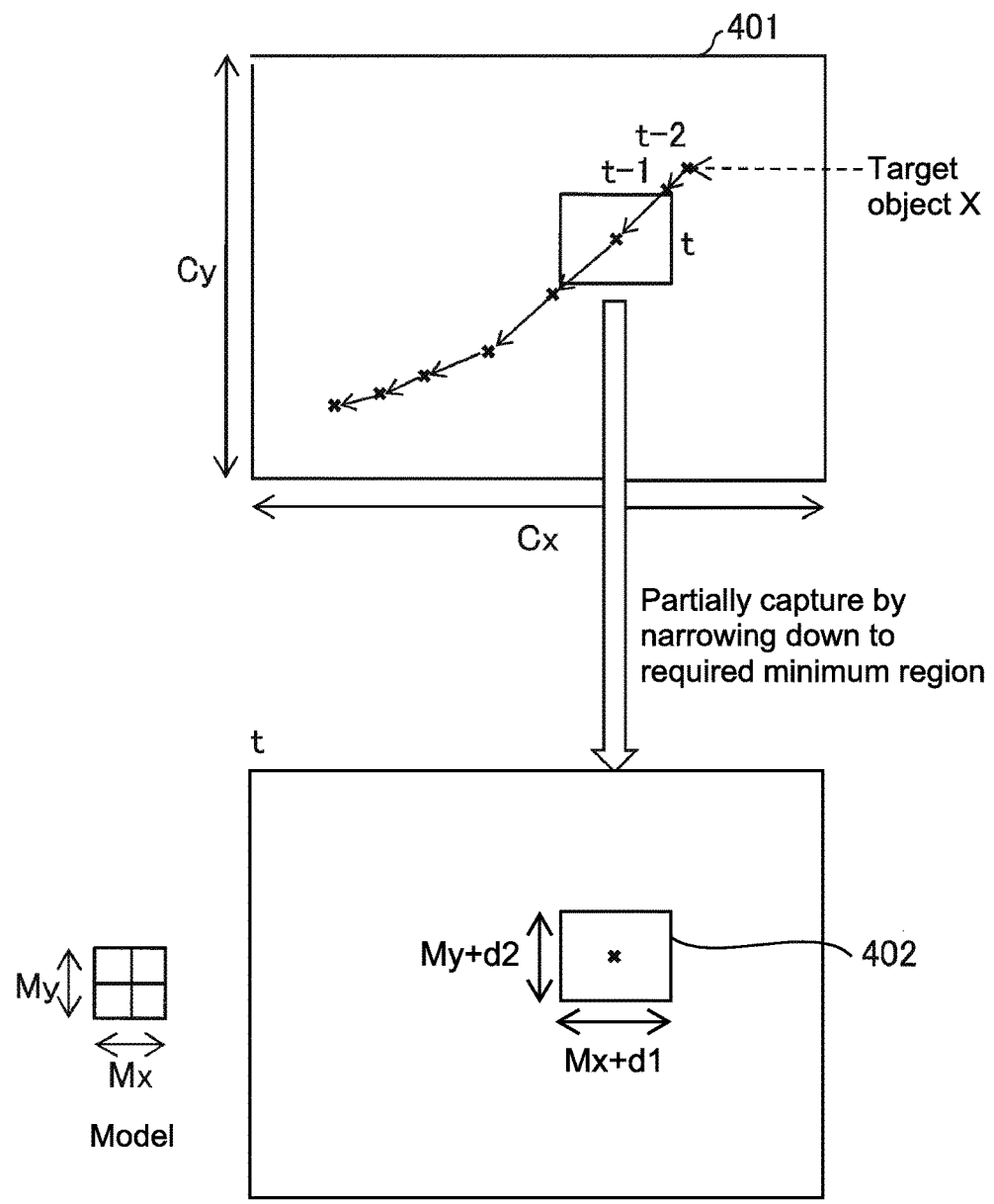
FIG. 4 is a diagram illustrating an outline of a method for restricting a search region.

A specific description will be given with reference to FIG. 4. FIG. 4 is a diagram illustrating an outline of a method for restricting a search region. FIG. 4 illustrates an example of a captured image 401, which is vertically Cy and horizontally Cx and which captures the control target 5, and the positions of the target object X over time are indicated by x marks for the sake of convenience. FIG. 4 indicates the lapse of time by "t−2", "t−1" and "t", and the position of the target object X at the time "t−2", the position of the target object X at the time "t−1", and the position of the target object X at the time "t" are indicated. In an embodiment, to grasp the accurate position of the target object X at the time "t", the position of the target object X at the time "t" is predicted by using the preceding time "t−1" (or depending on the situation, the second preceding time "t−2" is also used), and search is performed only in the part, in the captured image, of a predetermined region 402 including the predicted position. This eliminates the need to search the entire captured image 401, and even a high-resolution captured image may be processed in a short time. For example, if a rectangular region which is vertically My and horizontally Mx is used as a model, a rectangular region which is vertically My+d2 and horizontally Mx+d1 is conceivable as the predetermined region 402.

Configuration of Image Processing Device

Figure 1:
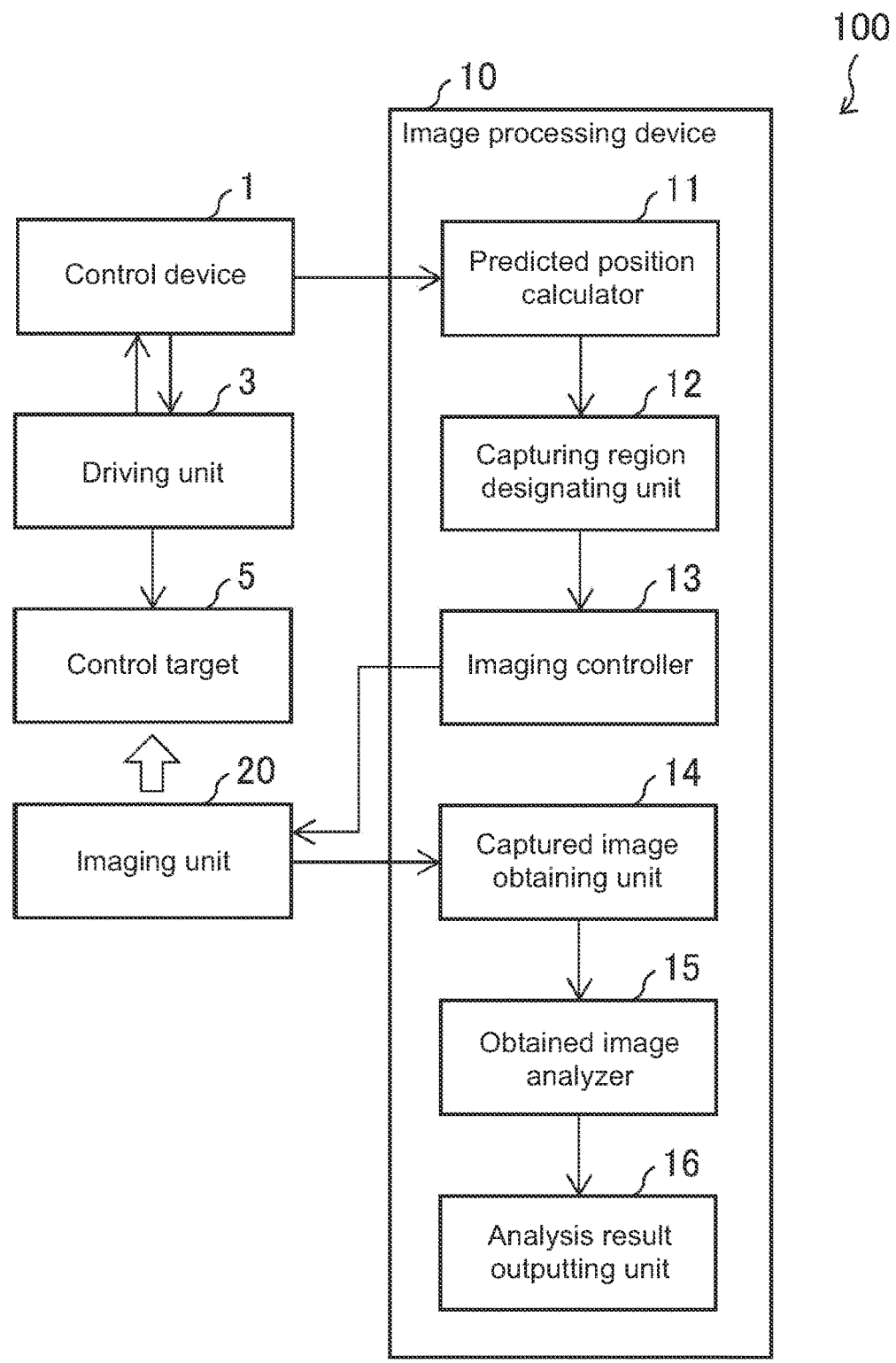
FIG. 1 is a block diagram illustrating a main configuration of an image processing device according to an embodiment.

Next, a main configuration of the image processing device 10 will be described with reference to FIG. 1. FIG. 1 is a block diagram illustrating a main configuration of the image processing device 10.

As illustrated in FIG. 1, the image processing device 10 includes a predicted position calculator (predicting unit) 11, a capturing region designating unit 12, an imaging controller (notifying unit) 13, a captured image obtaining unit (obtaining unit) 14, an obtained image analyzer (searching unit, region extracting unit) 15, and an analysis result outputting unit (outputting unit) 16.

The predicted position calculator 11 predicts a current position of the target object X at the control target 5. Then, the capturing region designating unit 12 is notified of the predicted position. More specifically, the predicted position calculator 11 obtains drive information (region restriction information, instruction information) for driving the control target 5 from the control device 1, and predicts the current position of the target object X from the obtained drive information and the previous position of the target object X. Additionally, the predicted position calculator 11 may predict the attitude of the target object X together with the position. This allows a predetermined region, described below, to be set according to the attitude.

The capturing region designating unit 12 designates a predetermined region including the predicted current position of the target object X notified by the predicted position calculator 11, and notifies the imaging controller 13 of the predetermined region.

The imaging controller 13 notifies the imaging unit 20 of the predetermined region notified by the capturing region designating unit 12, and causes the imaging unit 20 to capture an image of the control target 5.

The captured image obtaining unit 14 obtains, from the imaging unit 20, the part corresponding to the predetermined region (predetermined region image) in the captured image captured by the imaging unit 20, and transmits the image to the obtained image analyzer 15.

The obtained image analyzer 15 analyzes the predetermined region image transmitted from the captured image obtaining unit 14, searches for the target object X, and measures (detects) the position of the target object X. Then, the analysis result outputting unit 16 is notified of the measurement result. The method for measuring the position of the target object X by analyzing an image can be realized by a well-known technique, and description thereof is omitted.

The analysis result outputting unit 16 outputs the measurement result notified by the obtained image analyzer 15 to an external device or the like. Additionally, the image processing device 10 may include a display unit or the like, and the display unit may be caused to output the measurement result.

The imaging unit 20 captures an image of the control target 5 according to an instruction from the imaging controller 13. Then, of the captured image, only a predetermined region image corresponding to the predetermined region instructed by the imaging controller 13 is transmitted to the image processing device 10.

Flow of Processing of Image Processing Device

Figure 3A:
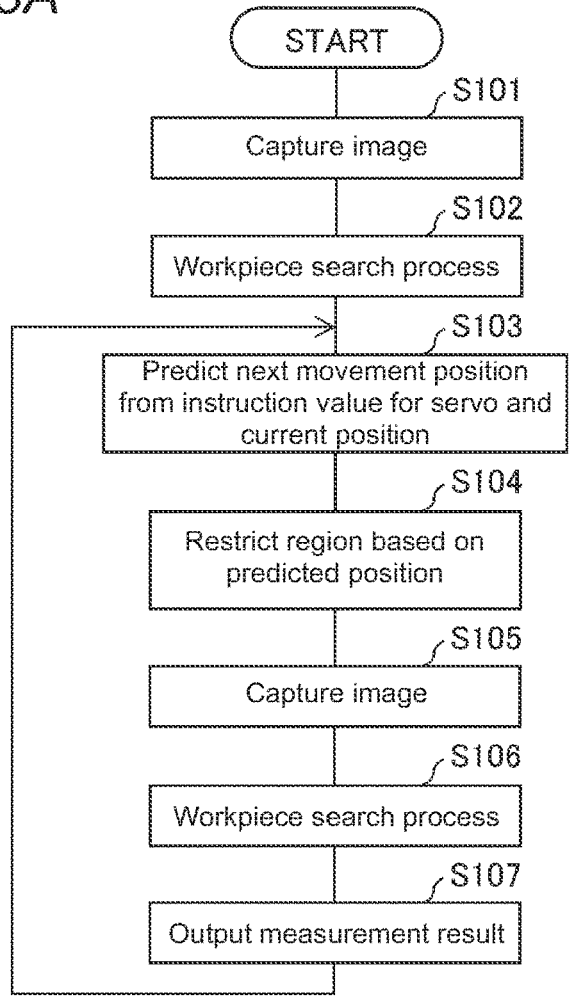
FIGS. 3A and 3B are diagrams illustrating a flow of processing of an image processing device, where
Figure 3B:
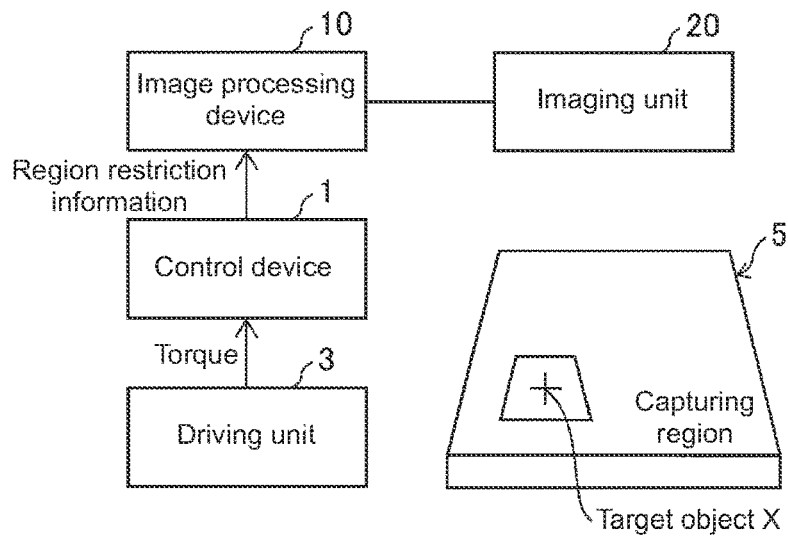

Next, a flow of processing of the image processing device 10 will be described with reference to FIGS. 3A and 3B. FIGS. 3A and 3B are diagrams illustrating a flow of processing of the image processing device 10, where FIG. 3A is a flowchart illustrating the flow of processing, and FIG. 3B is a diagram illustrating processing of the control system 100 in a simplified manner.

As illustrated in FIG. 3A, when control processing by the control system 100 is started, the imaging controller 13 causes the imaging unit 20 to capture an image of the control target 5 (S101). Next, the obtained image analyzer 15 measures the position of the target object X from the captured image (S102: workpiece search process). Next, the predicted position calculator 11 predicts the position of the target object X at the time of the next capturing, from the drive information regarding the control target 5 (instruction value for the servo motor 4) obtained from the control device 1 and the current position of the target object X (S103, prediction step). Then, the capturing region designating unit 12 designates, from the predicted position, a region including the position as the predetermined region (S104).

Then, the imaging controller 13 transmits information indicating the predetermined region to the imaging unit 20, and also, causes the imaging unit 20 to capture an image of the control target 5 (S105). The imaging unit 20 transmits a predetermined region image, in the captured image, corresponding to the predetermined region to the image processing device 10, and the obtained image analyzer 15 analyzes the predetermined region image, and measures (searches for) the position of the target object X (S106, search step). Then, the analysis result outputting unit 16 outputs the measurement result (S107, output step).

Another Example of Method for Obtaining Predetermined Region Image as Analysis Target Next, another example of the method for obtaining a predetermined region image which is a target to be analyzed by the obtained image analyzer 15 will be described with reference to FIGS. 5A to 5D. FIGS. 5A to 5D are diagrams for describing a method for obtaining a predetermined region image which is a target to be analyzed by the obtained image analyzer 15.

Figure 5A:
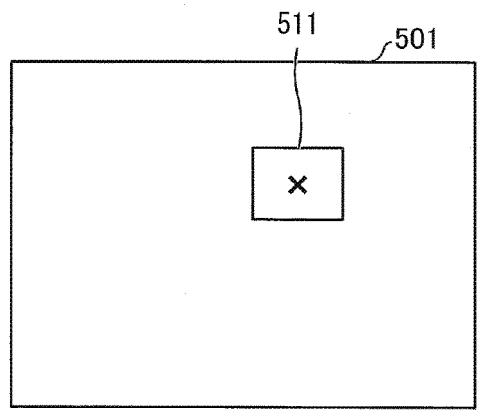
FIGS. 5A to 5D are diagrams illustrating a method for obtaining a predetermined region image which is a target to be analyzed by an obtained image analyzer.
Figure 5B:
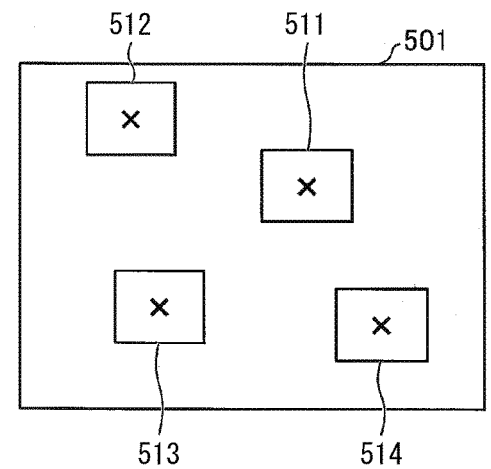

According to the configuration described above, an image that is transmitted from the imaging unit 20 to the image processing device 10 is the predetermined region image. That is, with reference to a captured image 501 as illustrated in FIGS. 5A and 5B, only a predetermined region image 511 in the captured image 501 is transmitted to the image processing device 10 in the example illustrated in FIG. 5A, and only predetermined region images 511, 512, 513, 514 in the captured image 501 are transmitted to the image processing device 10 in the example illustrated in FIG. 5B. Additionally, FIG. 5B illustrates an example of a case where there are a plurality of target objects X.

Figure 5C:
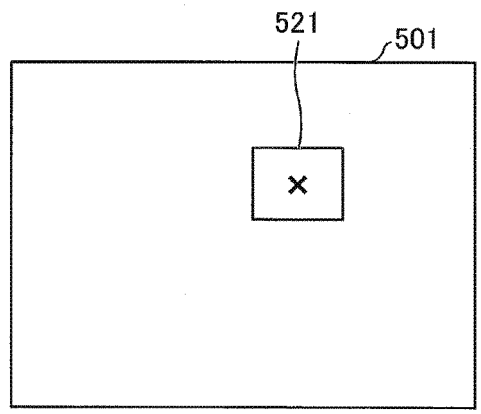
Figure 5D:
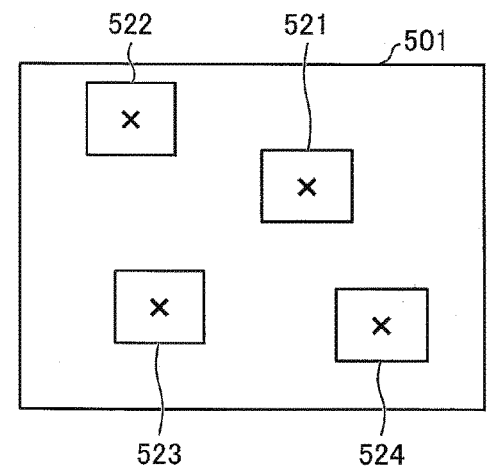

Such a configuration is not restrictive, and for example, the image that is transmitted from the imaging unit 20 to the image processing device 10 may be the captured image itself, that is, the image capturing the entire control target 5. In this case, the image processing device 10 which has obtained the captured image may analyze, by the obtained image analyzer 15, only the region, in the captured image, designated by the capturing region designating unit 12. That is, as illustrated in FIG. 5C, the image processing device 10 obtains the captured image 501, and the obtained image analyzer 15 analyzes only a predetermined region image 521, in the captured image 501, corresponding to the predetermined region. Or as illustrated in FIG. 5D, the image processing device 10 obtains the captured image 501, and the obtained image analyzer 15 analyzes only predetermined region images 521, 522, 523, 524, in the captured image 501, corresponding to the predetermined regions.

Also with such a configuration, the analysis target is not the entire captured image, but only a predetermined region in the captured image, and thus, the amount of processing may be reduced compared to a case of analyzing the entire captured image.

Processing Time

Figure 6:
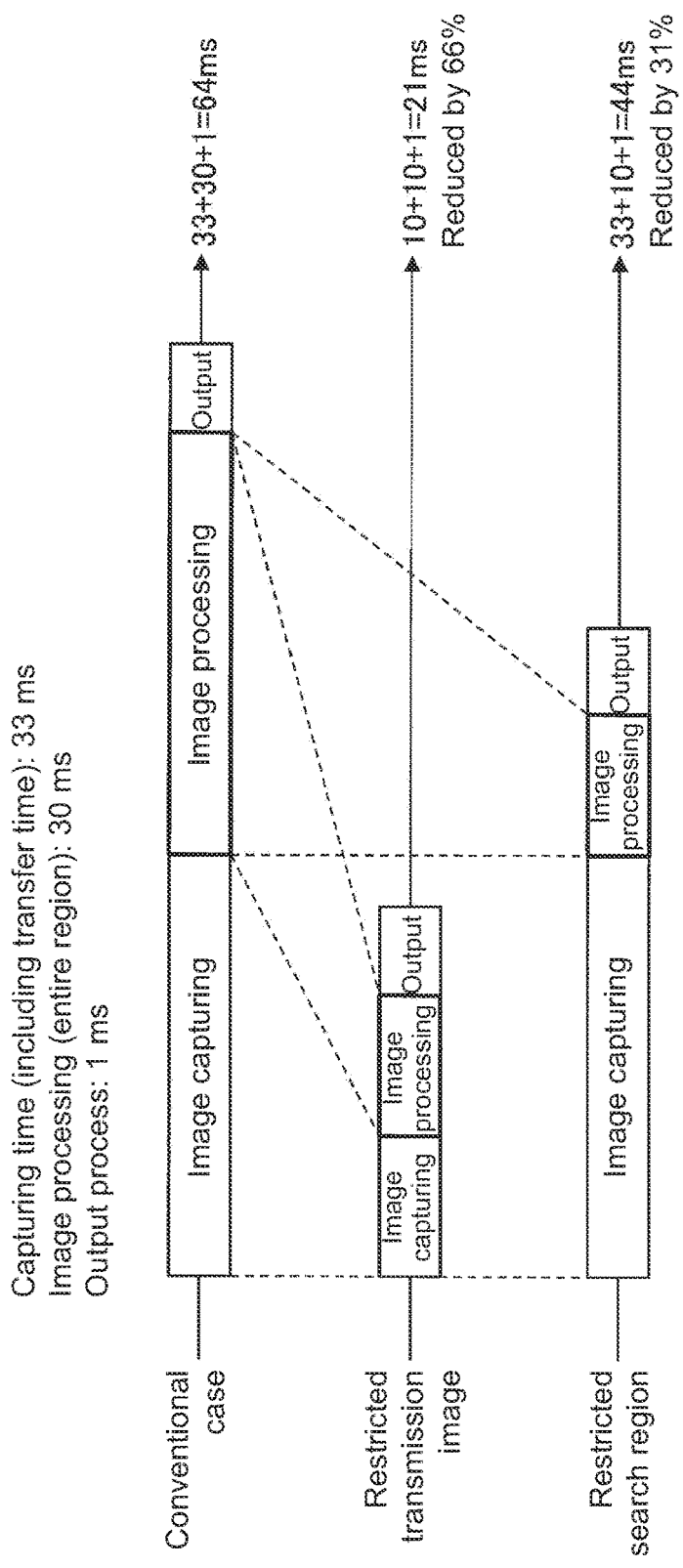
FIG. 6 is a diagram illustrating a comparison of a processing time according to a conventional technique and a processing time according to an embodiment.

Next, to what extent the processing time is reduced by an embodiment will be described with reference to FIG. 6. FIG. 6 is a diagram comparing a processing time according to a conventional technique and a processing time according to an embodiment.

As illustrated in FIG. 6, according to a conventional technique, the time taken for an imaging process (including the time of image transfer from the imaging device to the image processing device) is 33 ms, an image processing time for analysis of a captured image is 30 ms, and a process for outputting an analysis result takes 1 ms. That is, according to the conventional technique, the entire processing time is 33+30+1=64 ms.

By contrast, in an embodiment, firstly, a predetermined region image is transmitted from the imaging unit 20 to the image processing device 10, and thus, the transmission time is reduced, and the time taken for the imaging process is 10 ms. Also, the analysis target is only the predetermined region image, and the processing time is reduced, and the image processing time is 10 ms. The time taken for the output process is not changed. As a result, the entire processing time according to an embodiment is 10+10+1=21 ms, and is reduced by about 66% compared to the case of the conventional technique.

Furthermore, also in the case where the captured image to be transmitted from the imaging unit 20 is unchanged but the region as an analysis target is restricted by the image processing device 10, the image processing time is reduced to 10 ms. Accordingly, the entire processing time in this case is 33+10+1=44 ms, and is reduced by about 31% compared to the case of the conventional technique.

Example of Predetermined Region

Figure 7A:
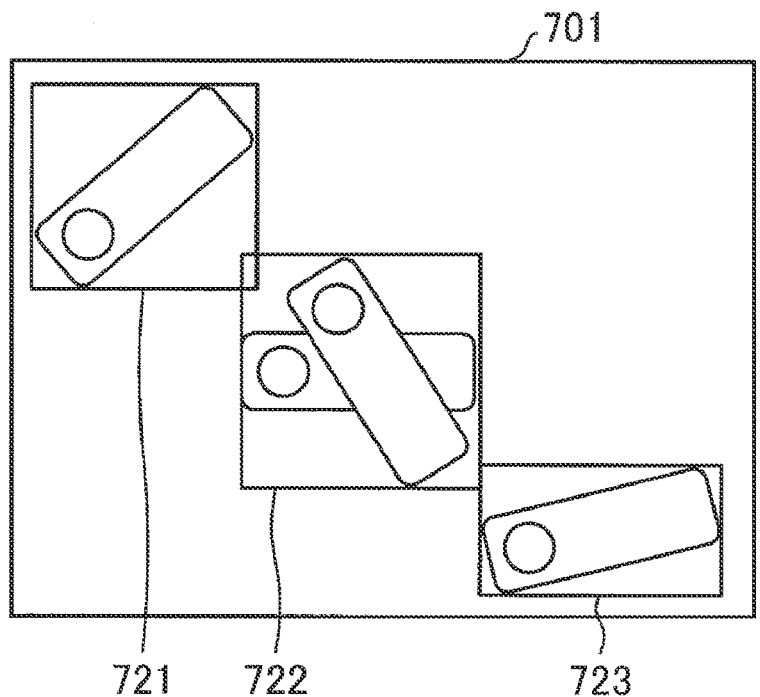
FIGS. 7A and 7B are diagrams illustrating examples of a predetermined region.
Figure 7B:
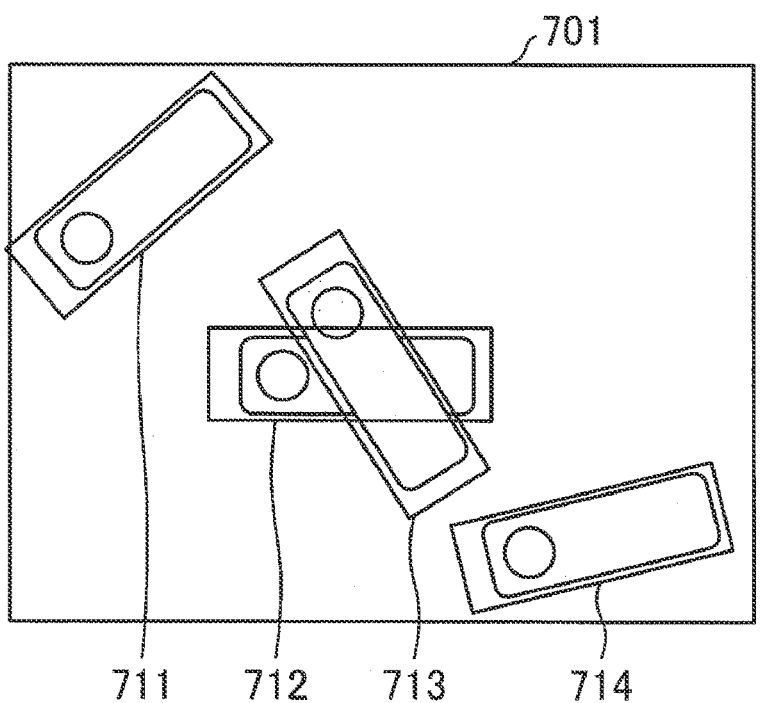

Next, examples of the predetermined region designated by the capturing region designating unit 12 will be described with reference to FIGS. 7A and 7B. FIGS. 7A and 7B are diagrams illustrating examples of the predetermined region. As described above, the predetermined region may be a rectangular region including the target object X (regions 721, 722, 723 in FIG. 7A), or may be a region according to the shape of the target object X as illustrated in FIG. 7B (regions 711, 712, 713, 714 in FIG. 7B).

Effect of Present Invention

Figure 8:
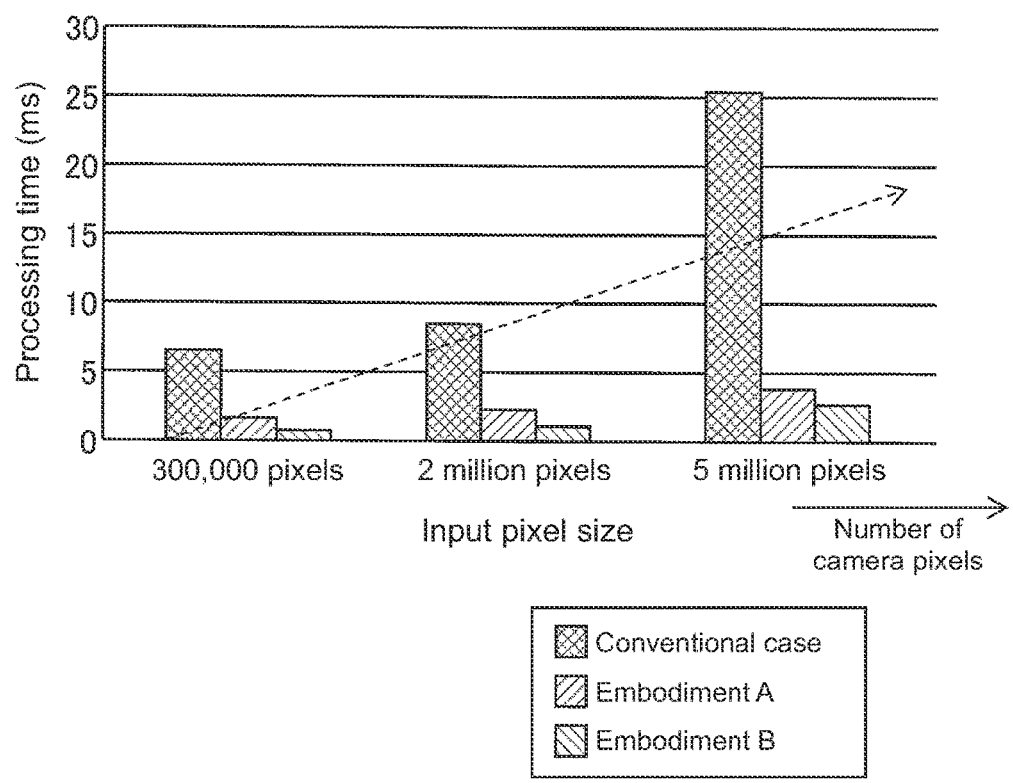
FIG. 8 is a diagram illustrating an effect of an embodiment.

Next, an effect of an embodiment will be described with reference to FIG. 8. FIG. 8 is a diagram for describing an effect of an embodiment. As illustrated in FIG. 8, it can be seen that, according to the conventional technique, the processing time is significantly increased as the number of pixels of the imaging device is increased.

On the other hand, according to an embodiment, the processing time is not greatly increased even when the number of pixels is increased. Additionally, in FIG. 8, an embodiment A is a case where processing is performed in a standard mode, and an embodiment B is a case where processing is performed in a high-speed alignment mode.

The standard mode corresponds to the configuration described above where the imaging unit 20 transmits the entire captured image to the image processing device 10 and where the image processing device 10 restricts the search region, and the high-speed alignment mode corresponds to the configuration described above where the image transmitted from the imaging unit 20 to the image processing device 10 is a predetermined region image.

Second Embodiment

Another embodiment will be described below with reference to FIGS. 9 to 11. Additionally, for the sake of convenience, members having the same function as the members described in the embodiment above will be denoted with the same reference signs, and description thereof will be omitted.

An embodiment is different from the first embodiment described above with respect to the method for predicting the current position of a target object X. First, a main configuration of an image processing device 10a according to an embodiment will be described with reference to FIG. 9. FIG. 9 is a block diagram illustrating a main configuration of the image processing device 10a.

Figure 9:
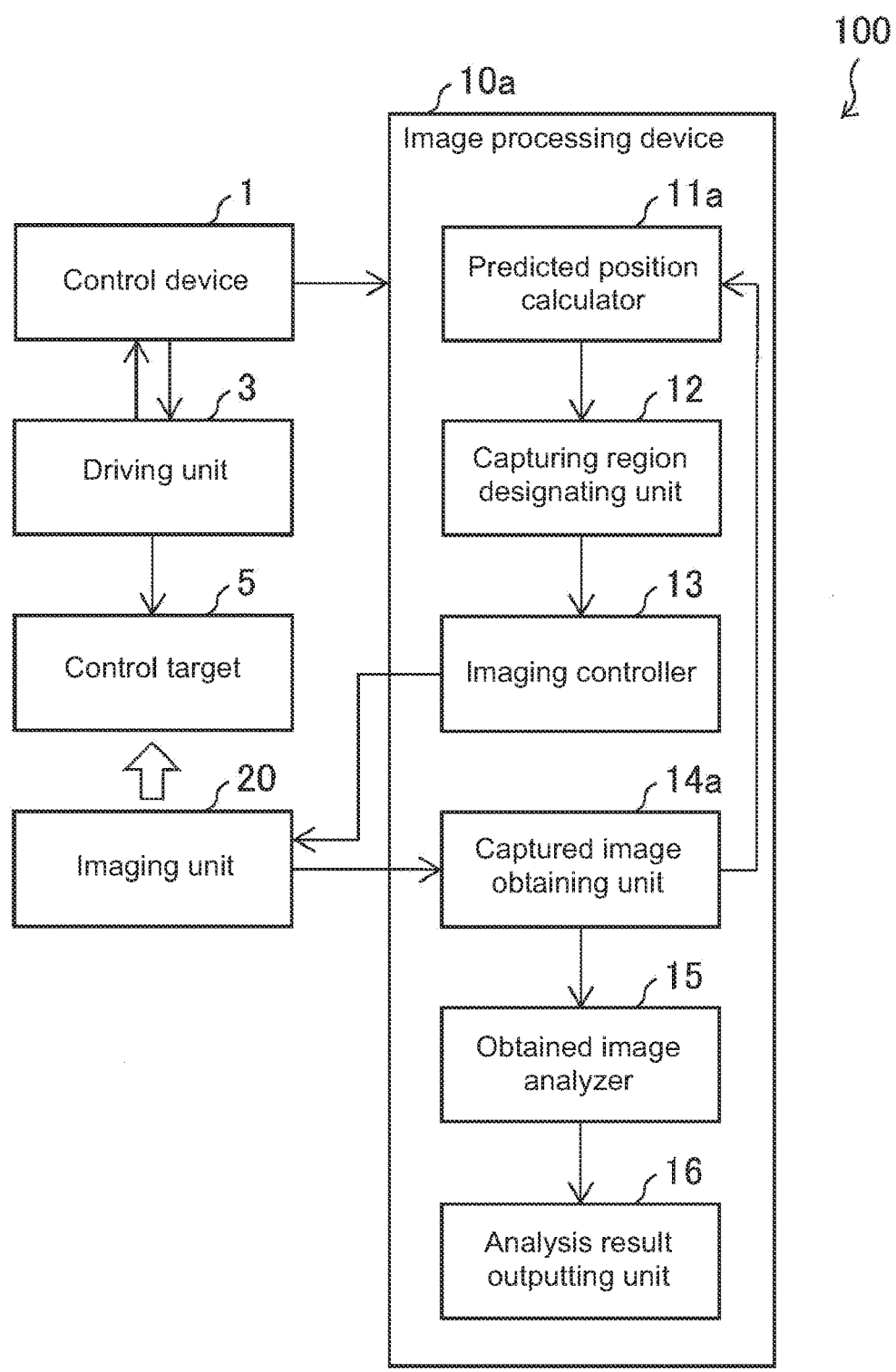
FIG. 9 is a block diagram illustrating a main configuration of an image processing device according to an embodiment.

As illustrated in FIG. 9, the image processing device 10a according to an embodiment includes a predicted position calculator (predicting unit) 11a instead of the predicted position calculator 11 of the image processing device 10 according to the first embodiment described above, and includes a captured image obtaining unit (obtaining unit) 14a instead of the captured image obtaining unit 14.

The predicted position calculator 11a predicts the current position of a target object X from a change in the position of the target object X in a plurality of captured images obtained by the captured image obtaining unit 14a. Details of the prediction method will be given below.

The captured image obtaining unit 14a transmits a captured image obtained from the imaging unit 20 to the obtained image analyzer 15, and also to the predicted position calculator 11a.

Figure 10A:
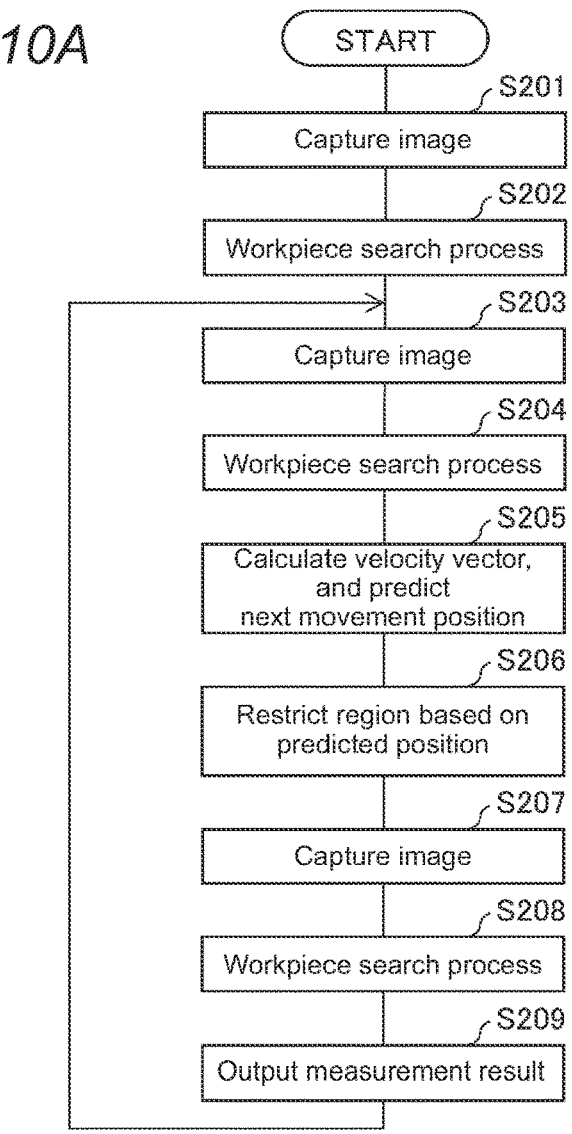
FIGS. 10A and 10B are diagrams illustrating a flow of processing of a image processing device according to an embodiment, where
Figure 10B:
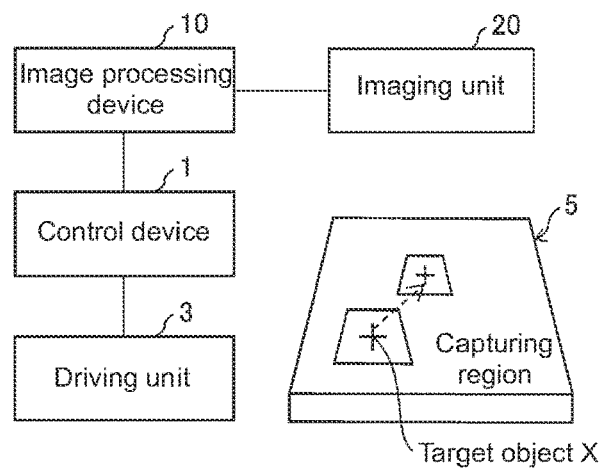

Next, a flow of processing of the image processing device 10a will be described with reference to FIGS. 10A and 10B. FIGS. 10A and 10B are diagrams illustrating a flow of processing of the image processing device 10a, where FIG. 10A is a flowchart illustrating the flow of processing, and FIG. 10B is a diagram illustrating processing of the control system 100 in a simplified manner.

As illustrated in FIG. 10A, when control processing by the control system 100 is started, the imaging controller 13 causes the imaging unit 20 to capture an image of the control target 5 (S201). Next, the obtained image analyzer 15 measures the position of the target object X from the captured image (S202: workpiece search process). Then, the imaging controller 13 causes the imaging unit 20 to capture an image of the control target 5 in the same manner (S203).

Also, the obtained image analyzer 15 measures the position of the target object X from the captured image (S204: workpiece search process).

Next, the predicted position calculator 11a calculates a velocity vector of the target object X by using the captured images obtained from the captured image obtaining unit 14a, and predicts the position of the target object X at the time of the next capturing (S205). Then, the capturing region designating unit 12 designates, from the predicted position, a region including the position as the predetermined region (S206).

Then, the imaging controller 13 transmits information indicating the predetermined region to the imaging unit 20, and also, causes the imaging unit 20 to capture an image of the control target 5 (S207). The imaging unit 20 transmits a predetermined region image, in the captured image, corresponding to the predetermined region to the image processing device 10, and the obtained image analyzer 15 analyzes the predetermined region image, and measures the position of the target object X (S208). Then, the analysis result outputting unit 16 outputs the measurement result (S209).

Next, a method for calculating the velocity vector of the target object X will be described with reference to FIG. 11. FIG. 11 is a diagram for describing a method for calculating the velocity vector of the target object X.

Figure 11:
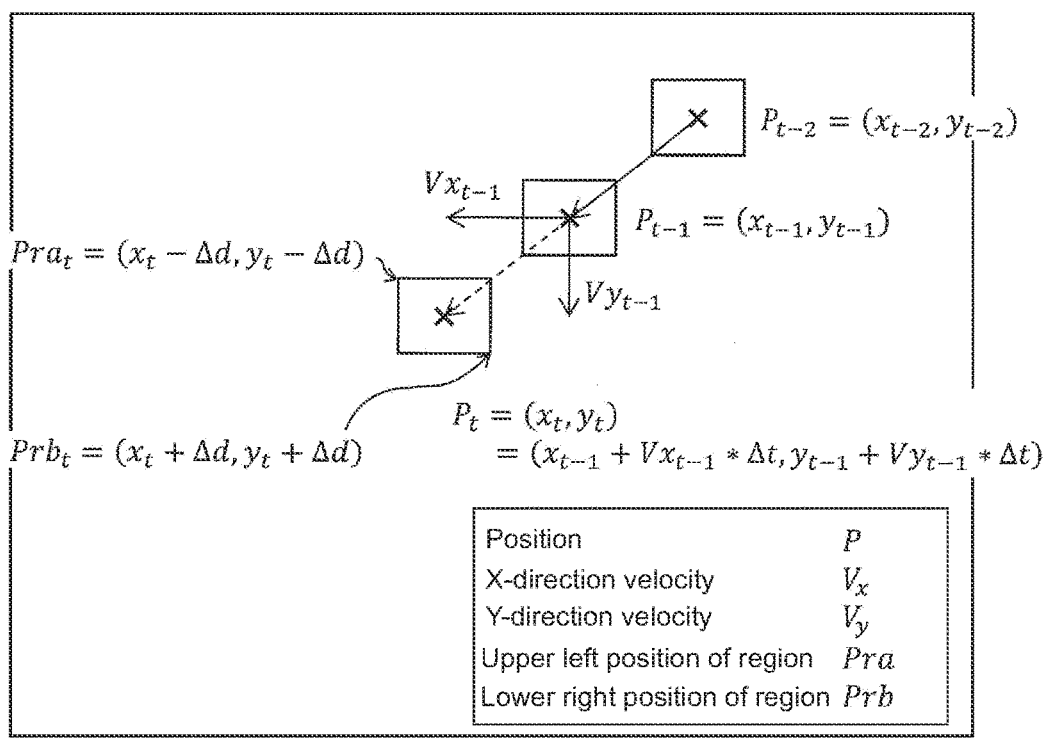
FIG. 11 is a diagram illustrating a method for calculating a velocity vector of a target object X.

In FIG. 11, P indicates the position of the target object X, Vx indicates the velocity vector in the x-direction, and Vy indicates the velocity vector in the y-direction. Also, Pra indicates the upper left position of a predetermined region, and Prb indicates the lower right position of the predetermined region.

In FIG. 11, $P_{t-2}=(X_{t-2}, y_{t-2})$ indicates the position of the target object X at the time of second previous capturing, and $P_{t-1}=(x_{t-1}, y_{t-1})$ indicates the position of the target object X at the time of previous capturing.

First, the predicted position calculator 11a determines the velocity vector at the time of the target object X moving from $P_{t-2}$ to $P_{t-1}$. Here, the x-direction component of the velocity vector is $Vx_{t-1}$, and the y-direction component is $Vy_{t-1}$.

The predicted position calculator 11a predicts a current position $P_t$ of the target object X by using the following equation.

$$P_t=(x_t,y_t)=(x_{t-1}+Vx_{t-1}\times\Delta t, y_{t-1}+Vy_{t-1}\times\Delta t)$$

Here, $\Delta t$ is a capturing time interval.

Also, the capturing region designating unit 12 sets an upper left position $Pra_t$ of the predetermined region to $(x_t-\Delta d, y_t-\Delta d)$, and sets a lower right position $Prb_t$ of the predetermined region to $(x_t+\Delta d, y_t+\Delta d)$. The size of the predetermined region is indicated by $\Delta d$, and $\Delta d$ may be arbitrarily set. Additionally, in this case, the x-direction and the y-direction take the same value (that is, the predetermined region is a square), but this is not restrictive, and the predetermined region may alternatively be rectangular with the x-direction being $\Delta d_1$ and the y-direction being $\Delta d_2$.

Third Embodiment

Further another embodiment will be described below with reference to FIGS. 12 to 16. Additionally, for the sake of convenience, members having the same function as the members described in the embodiments above will be denoted with the same reference signs, and description thereof will be omitted.

An embodiment assumes a control system according to which the control target 5 is a not an XYθ stage but a conveying device (such as a conveyor belt), and according to which a target object X moving on the control target 5 is picked up at a predetermined position.

Figure 12:
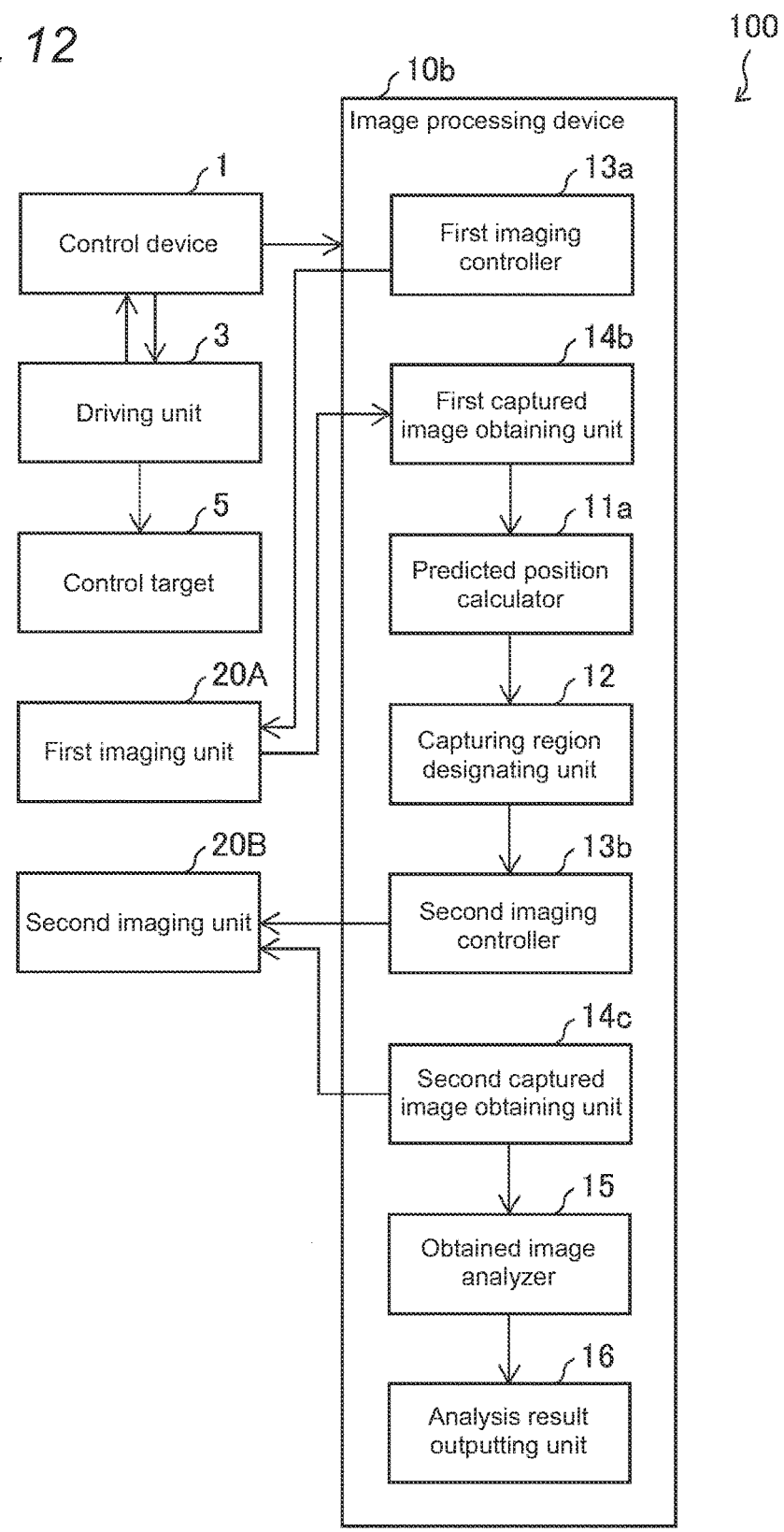
FIG. 12 is a block diagram illustrating a main configuration of an image processing device according to an embodiment.

First, a main configuration of an image processing device 10b according to an embodiment will be described with reference to FIG. 12. FIG. 12 is a block diagram illustrating a main configuration of the image processing device 10b. As illustrated in FIG. 12, the image processing device 10b according to an embodiment includes the predicted position calculator 11a, the capturing region designating unit 12, the imaging controller (notifying unit) 13a, an imaging controller 13b, a captured image obtaining unit (obtaining unit) 14b, a captured image obtaining unit 14c, the obtained image analyzer 15, and the analysis result outputting unit 16.

Furthermore, the control system 100 includes a first imaging unit (imaging device, first imaging device) 20A and a second imaging unit (imaging device, second imaging device) 20B, instead of the imaging unit 20 according to the embodiments described above.

The imaging controller 13a causes the first imaging unit 20A to capture an image of the control target 5. The imaging controller 13b causes the second imaging unit 20B to capture an image of the control target 5. The captured image obtaining unit 14b obtains a captured image from the first imaging unit 20A. The captured image obtaining unit 14c obtains a captured image from the second imaging unit 20B.

The first imaging unit 20A is arranged on the upstream side of the second imaging unit 20B. Additionally, the second imaging unit 20B may have a higher resolution than the first imaging unit 20A.

Figure 13A:
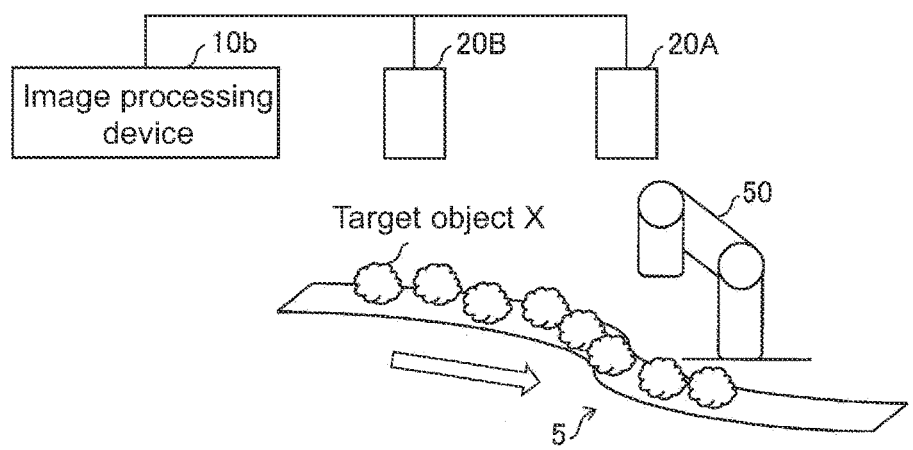
FIGS. 13A to 13C are diagrams illustrating an example of a control system according to an embodiment, where
Figure 13B:
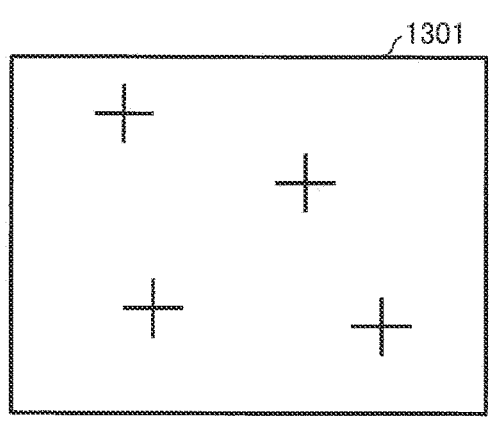
Figure 13C:
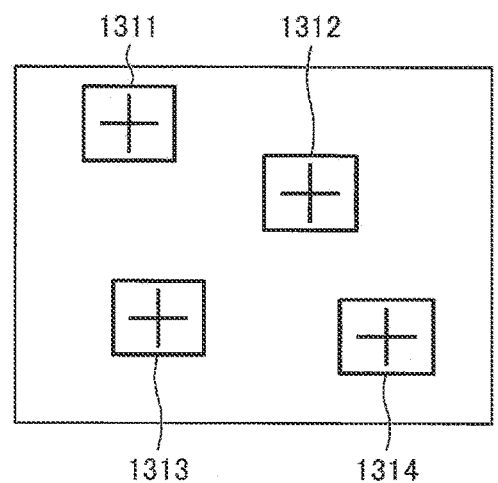

A more detailed description will be given with reference to FIGS. 13A to 13C. FIGS. 13A to 13C are diagrams illustrating an example of the control system according to an embodiment, where FIG. 13A is a diagram illustrating an outline of the control system, FIG. 13B is a diagram illustrating an example image that is captured by the first imaging unit 20A, and FIG. 13C is a diagram illustrating an example image that is captured by the second imaging unit 20B.

As illustrated in FIG. 13A, according to an embodiment, a target object X is moved by the control target 5, and is eventually picked up by a robot 50. The second imaging unit 20B is arranged in a manner capable of capturing the position of the control target 5 corresponding to the pick-up position of the robot 50, and the first imaging unit 20A is arranged (installed) on the upstream side of the second imaging unit 20B.

As illustrated in FIG. 13B, an image of the control target 5 is captured by the first imaging unit 20A on the upstream side and the position of the target object X is measured from the captured image, and the second imaging unit 20B on the downstream side captures an image of a position, predicted from the measured position, corresponding to the position of the target object X. In the example illustrated in FIG. 13C, capturing regions 1311, 1312, 1313, 1314 are the capturing regions of the second imaging unit 20B.

This allows the position of the target object X to be more accurately measured (grasped), and a pick-up process of the target object X by the robot 50 may be accurately performed.

Figure 14:
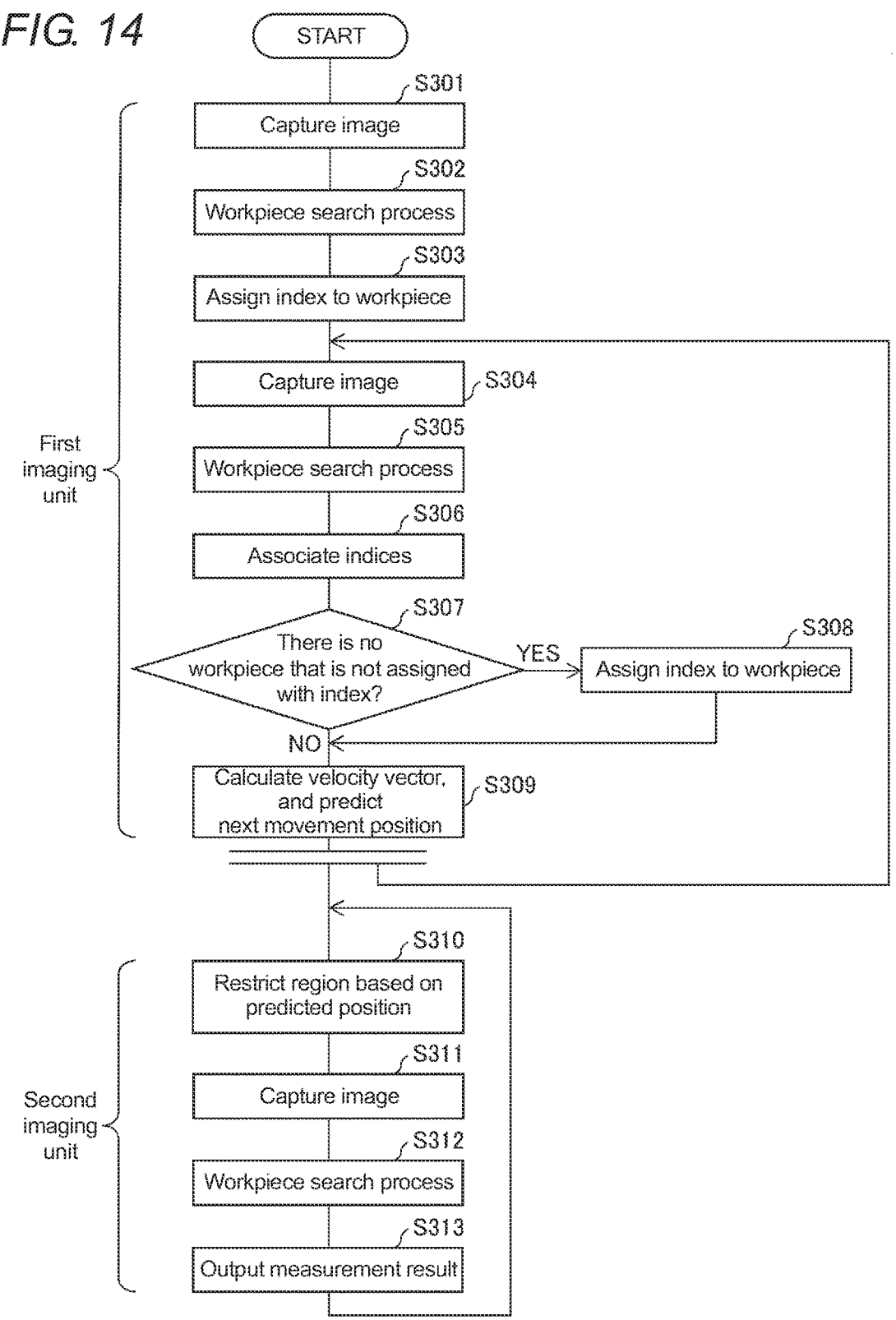
FIG. 14 is a flowchart illustrating a flow of processing of an image processing device according to an embodiment.
Figure 15:
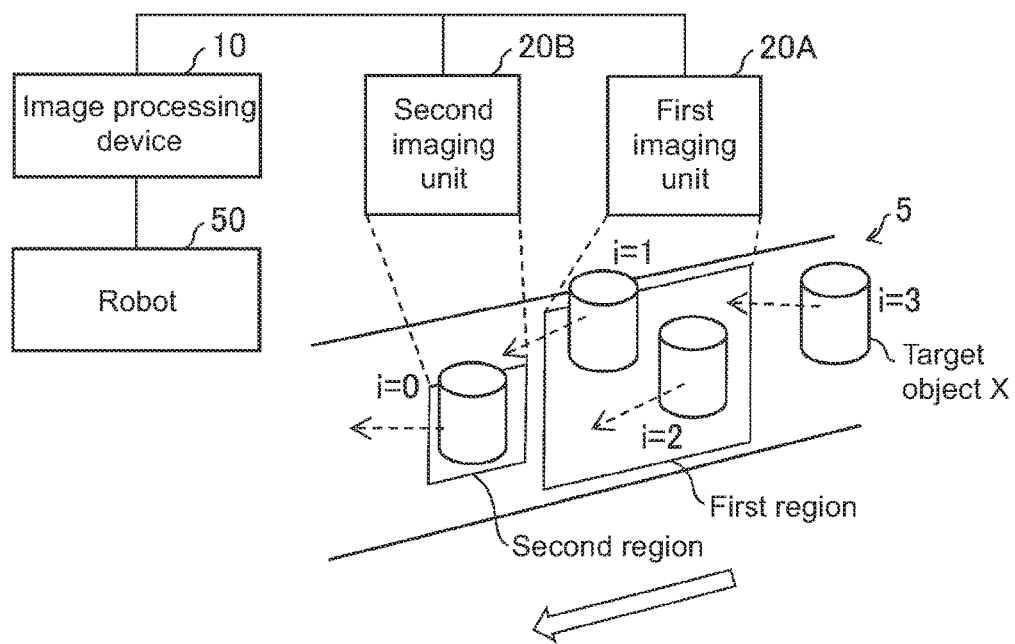
FIG. 15 is a diagram illustrating an outline of a control system according to an embodiment.

Next, a flow of processing of the image processing device 10b will be described with reference to FIGS. 14 and 15. FIG. 14 is a flowchart illustrating a flow of processing of the image processing device 10b. Also, FIG. 15 is a diagram illustrating an outline of the control system 100 according to an embodiment.

As illustrated in FIG. 14, when control processing by the control system 100 is started, the imaging controller 13a causes the first imaging unit 20A to capture an image of the control target 5 (S301). Next, the predicted position calculator 11a measures the position of the target object X from the captured image captured by the first imaging unit 20A (S302: workpiece search process). Then, the predicted position calculator 11a assigns an index to the target object X (S303). Specifically, as illustrated in FIG. 15, an index such as i=0, . . . , 3 is assigned to a target object X present in a capturing region (first region) that is captured by the first imaging unit 20A. Then, the imaging controller 13a causes the first imaging unit 20A to capture an image of the control target 5 in the same manner (S304). Also, the predicted position calculator 11a measures the position of the target object X from the captured image (first captured image) captured by the first imaging unit 20A (S305: workpiece search process). Then, the predicted position calculator 11a performs association of indices with respect to the target object X (S306). Specifically, the same index is assigned to a target object X that is the same target object X to which an index was previously assigned. If there is a target object X which is not assigned with an index (S307: YES), an index is assigned to this target object X (S308).

Then, the predicted position calculator 11a calculates the velocity vector of the target object X by using the two captured images, and predicts the movement position of the target object X (S309).

Then, step S304 is performed again, and also, the process in step S310 is performed.

In step S310, the capturing region designating unit 12 designates a predetermined region including the position predicted in step S309 (S310).

Then, the imaging controller 13b transmits information indicating the predetermined region to the second imaging unit 20B, and also, causes the second imaging unit 20B to capture an image of a region, of the control target 5, corresponding to the predetermined region (for example, a second region in FIG. 15) (S311). Then, the second imaging unit 20B transmits the captured image to the image processing device 10b, and the obtained image analyzer 15 analyzes the captured image (second captured image), and measures the position of the target object X (S312). Then, the analysis result outputting unit 16 outputs the measurement result (S313).

Figure 16:
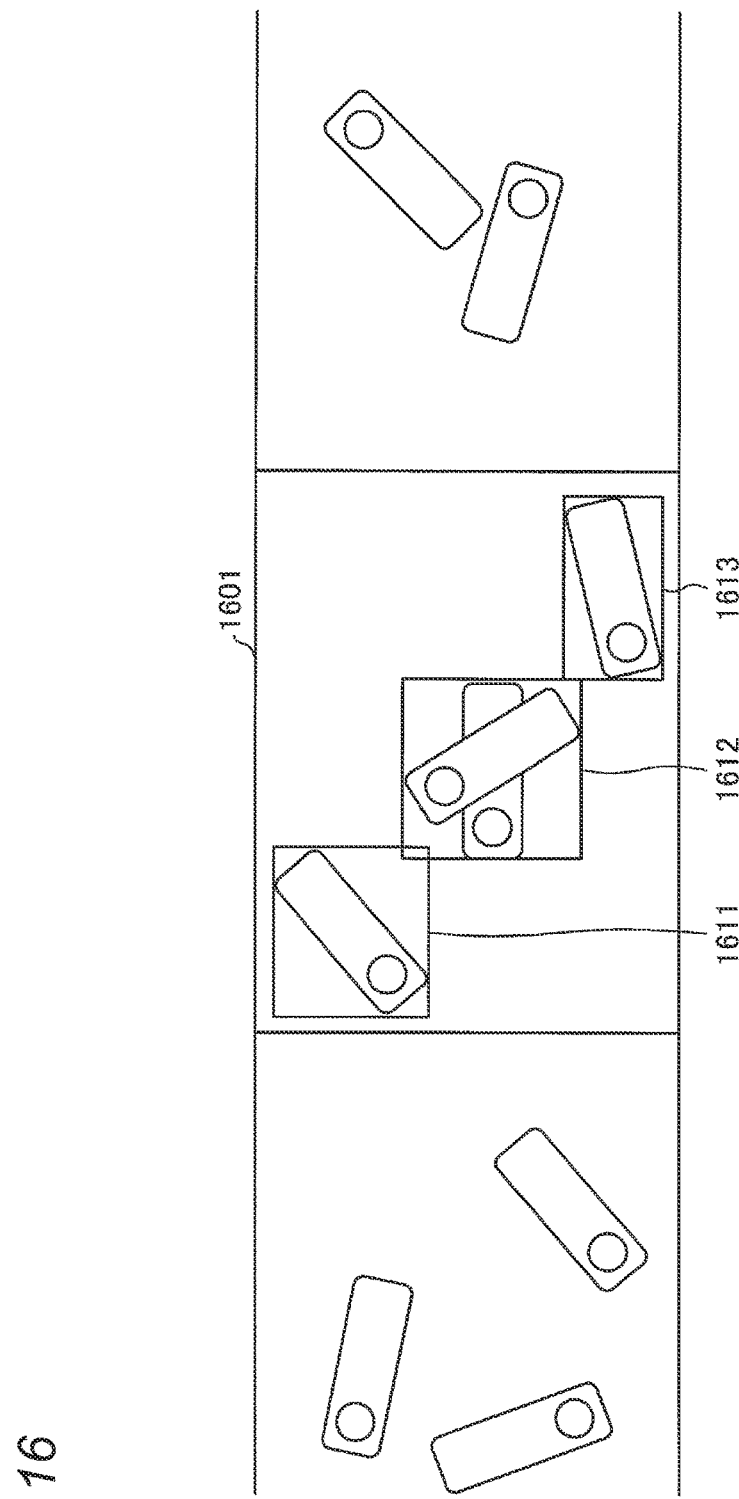
FIG. 16 is a diagram illustrating predetermined regions according to an embodiment.
Figure 17:
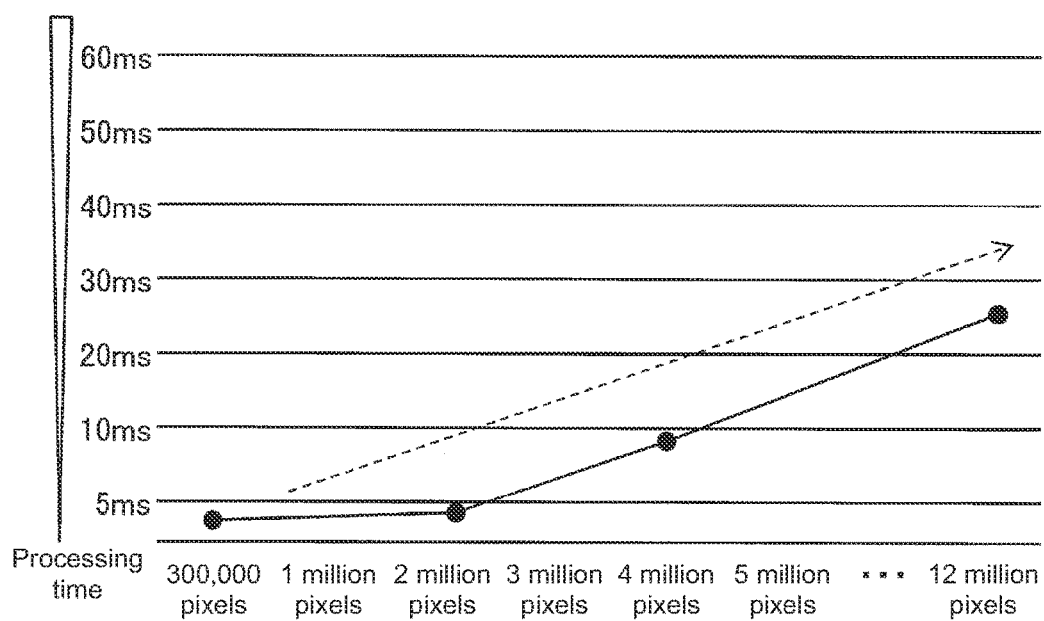
FIG. 17 is a diagram illustrating a relationship between the number of pixels and a processing time.

Next, predetermined regions will be described with reference to FIG. 16. FIG. 16 is a diagram for describing predetermined regions according to an embodiment. A capturing region 1601 in FIG. 16 is a region corresponding to the capturing region of the first imaging unit 20A. The capturing region designating unit 12 designates, as predetermined regions, regions 1611, 1612, 1613, which are regions including positions predicted from positions of target objects X in a captured image captured by the first imaging unit 20A.

Example Implementation by Software

A control block of the image processing device 10 (10a, 10b) (particularly, the predicted position calculator 11 (11a), the capturing region designating unit 12, the imaging controller 13 (13a, 13b), the captured image obtaining unit 14 (14a, 14b, 14c), the obtained image analyzer 15, the analysis result outputting unit 16) may be realized by a logic circuit (hardware) formed to an integrated circuit (IC chip) or the like, or may be realized by software using a central processing unit (CPU).

In the latter case, the image processing device 10 (10a, 10b) includes a CPU that executes instructions of a program that is software realizing each function, a read only memory (ROM) or a storage device (each referred to as "recording medium") storing the program and various pieces of data in such a form that they are readable by a computer (or a CPU), and a random access memory (RAM) that develops the program, for example. An aspect can be achieved by a computer (or a CPU) reading and executing the program stored in the recording medium. As the storage medium, "a non-transitory tangible medium" such as a tape, a disk, a card, a semiconductor memory, or a programmable logic circuit may be used. Also, the program may be provided to the computer via any transmission medium (such as a communication network or a broadcast wave) which is capable of transmitting the program. Additionally, an aspect can also be implemented by the program which is embodied by electronic transmission as a data signal embedded in a carrier wave.

The present invention is not limited to the embodiments described above, and various modifications may be made within the scope of the claims, and embodiments combining technical means disclosed in different embodiments are also included in the technical scope of the present invention.

The invention claimed is:

1. An image processing device used for position control of a target object and configured to detect a position of the target object from a captured image captured by an imaging device, the image processing device comprising a processor configured with a program to perform operations comprising:
    operation as a predicting unit configured to predict a current position of the target object;
    operation as a searching unit configured to search for the target object in the captured image, and measure the current position of the target object by searching a predetermined region comprising a partial region of the captured image, the partial region comprising the target object and the predicted current position predicted by the predicting unit; and
    operation as an outputting unit configured to output a result of the measured current position of the target object measured by the searching unit.

2. The image processing device according to claim 1, wherein the processor is configured with the program such that operation as the predicting unit comprises operation as the predicting unit that predicts the current position of the target object based on instruction information from a control device configured to control the position of the target object.

3. The image processing device according to claim 1, wherein the processor is configured with the program such that operation as the predicting unit comprises operation as the predicting unit that predicts the current position of the target object based on a change in the position of the target object in a plurality of captured images captured by the imaging device.

4. The image processing device according to claim 1, wherein:
    the processor is configured with the program to perform operations further comprising:
        operation as a notifying unit configured to notify the imaging device of the predetermined region; and
        operation as an obtaining unit configured to obtain the partial region of the captured image corresponding to the predetermined region from the imaging device; and
    the processor is configured with the program such that operation as the searching unit comprises operation as the searching unit that searches for the target object and measures the current position of the target object from the partial region of the captured image obtained by the obtaining unit.

5. The image processing device according to claim 1, wherein:
    the processor is configured with the program to perform operations further comprising:
        operation as an obtaining unit configured to obtain the captured image from the imaging device; and
        operation as a region extracting unit configured to extract the predetermined region from the captured image; and
    the processor is configured with the program such that operation as the searching unit comprises operation as the searching unit that searches for the target object and measures the current position of the target object from the predetermined region extracted by the region extracting unit.

6. The image processing device according to claim 1, wherein:
    the imaging device comprises a plurality of imaging devices;
    the processor is configured with the program such that operation as the predicting unit comprises operation as the predicting unit that predicts the current position of the target object based on a first captured image captured by a first imaging device of the plurality of imaging devices; and
    the processor is configured with the program such that operation as the searching unit comprises operation as the searching unit that searches for the target object and measures the current position of the target object by searching a second captured image captured by a second imaging device of the plurality of imaging devices, the second captured image comprising the predetermined region.

7. A control system comprising:
    the image processing device according to claim 6; and
    a conveying device,
    wherein the target object is moved by the conveying device, and
    the first imaging device is installed on an upstream side of the conveying device relative to the second imaging device.

8. A control system comprising:
    the image processing device according to claim 1;
    a control device configured to control the position of the target object; and
    the imaging device configured to capture an image of a region including the target object.

9. A control method of an image processing device used for position control of a target object and configured to detect a position of the target object from a captured image captured by an imaging device, the control method comprising:
    predicting a current position of the target object;
    searching for the target object in the captured image, and measuring the current position of the target object by searching a predetermined region comprising a partial region of the captured image, the partial region comprising the target object and the predicted current position of the target object; and
    outputting a result of the measured current position of the target object.

10. A non-transitory computer-readable storage storing a control program for causing a computer to function as the image processing device according to claim 1.

11. The image processing device according to claim 2, wherein:
the processor is configured with the program to perform operations further comprising:
operation as a notifying unit configured to notify the imaging device of the predetermined region; and
operation as an obtaining unit configured to obtain the partial region of the captured image corresponding to the predetermined region from the imaging device; and
the processor is configured with the program such that operation as wherein the searching unit comprises operation as the searching unit that searches for the target object and measures the current position of the target object from the partial region of the captured image obtained by the obtaining unit.

12. The image processing device according to claim 3, wherein:
the processor is configured with the program to perform operations further comprising:
operation as a notifying unit configured to notify the imaging device of the predetermined region; and
operation as an obtaining unit configured to obtain the partial region of the captured image corresponding to the predetermined region from the imaging device; and
the processor is configured with the program such that operation as the searching unit comprises operation as the searching unit that searches for the target object and measures the current position of the target object from the partial region of the captured image obtained by the obtaining unit.

13. The image processing device according to claim 2, wherein:
the processor is configured with the program to perform operations further comprising:
operation as an obtaining unit configured to obtain the captured image from the imaging device; and
operation as a region extracting unit configured to extract the predetermined region from the captured image; and
the processor is configured with the program such that operation as the searching unit comprises operation as the searching unit that searches for the target object and measures the current position of the target object from the predetermined region extracted by the region extracting unit.

14. The image processing device according to claim 3, wherein:
the processor is configured with the program to perform operations further comprising:
operation as an obtaining unit configured to obtain the captured image from the imaging device; and
operation as a region extracting unit configured to extract the predetermined region from the captured image; and
the processor is configured with the program such that operation as the searching unit comprises operation as the searching unit that searches for the target object and measures the current position of the target object from the predetermined region extracted by the region extracting unit.

15. The control method according to claim 9, wherein predicting the current position of the target object comprises predicting the current position of the target object based on instruction information from a control device configured to control the position of the target object.

16. The control method according to claim 9, wherein predicting the current position of the target object comprises predicting the current position of the target object based on a change in the position of the target object in a plurality of captured images.

17. The control method according to claim 9, wherein:
predicting the current position of the target object comprises predicting the position of the target object based on a first captured image; and
searching for the target object in the captured image, and measuring the current position of the target object by searching the predetermined region comprising the partial region of the captured image comprises measuring the position of the target object by searching the predetermined region comprising the partial region of a second captured image.

* * * * *